United States Patent [19]
Ranke et al.

[11] 4,332,596
[45] Jun. 1, 1982

[54] ENERGY EFFICIENT SCRUBBING OF SULFUR COMPOUNDS FROM MOIST GASEOUS MIXTURES

[75] Inventors: Gerhard Ranke, Pöcking; Friedrich Siegert, Wolfratshausen, both of Fed. Rep. of Germany

[73] Assignee: Linde Aktiengesellschaft, Wiesbaden, Fed. Rep. of Germany

[21] Appl. No.: 159,311

[22] Filed: Jun. 13, 1980

[30] Foreign Application Priority Data

Jun. 15, 1979 [DE] Fed. Rep. of Germany ....... 2924162

[51] Int. Cl.³ .............................................. B01D 53/14
[52] U.S. Cl. .......................................... 55/18; 55/20; 55/21; 55/48; 55/73
[58] Field of Search ................... 55/30, 31, 44, 48, 51, 55/73, 18, 20, 21

[56] References Cited

U.S. PATENT DOCUMENTS

| | | | |
|---|---|---|---|
| 3,710,546 | 1/1973 | Grunewald et al. | 55/73 X |
| 3,899,312 | 8/1975 | Kruis et al. | 55/73 X |
| 3,910,777 | 10/1975 | Jakob | 55/73 |
| 3,935,188 | 1/1976 | Karwat | 55/73 X |
| 3,975,172 | 8/1976 | Ranke | 55/73 X |
| 4,050,909 | 9/1977 | Ranke | 55/73 X |
| 4,137,294 | 1/1979 | Braizler et al. | 55/73 X |
| 4,155,988 | 5/1979 | Karwat et al. | 55/73 X |

FOREIGN PATENT DOCUMENTS

| | | | |
|---|---|---|---|
| 569160 | 1/1959 | Canada | 55/73 |
| 1231222 | 9/1969 | Fed. Rep. of Germany | 55/73 |
| 168482 | 2/1921 | United Kingdom | 55/73 |
| 728444 | 4/1955 | United Kingdom | 55/73 |
| 1104628 | 2/1968 | United Kingdom | 55/73 |

*Primary Examiner*—Robert H. Spitzer
*Attorney, Agent, or Firm*—Millen & White

[57] ABSTRACT

In the selective removal of sulfur compounds, e.g., $H_2S$, COS, from moist gaseous mixtures, comprising scrubbing the gaseous mixture in a column at a temperature below 0° C., with toluene or xylene as the scrubbing liquid, and prior to the scrubbing stage, contacting the moist gaseous mixture with liquid methanol before the gaseous mixture is cooled to the scrubbing temperature, passing the scrubbing liquid containing absorbed sulfur compounds to a thermal regenerating column, and recycling resultant thermally regenerated scrubbing agent to the scrubbing stage, the improvement of maintaining a methanol concentration of above 2%, e.g. 3–8% to about 30% by weight in the scrubbing liquid to be recycled from the sump of the thermal regenerating column to the scrubbing column. This permits a lower reboiling temperature in the regenerating column so that low pressure steam can be used, among other advantages.

12 Claims, 1 Drawing Figure

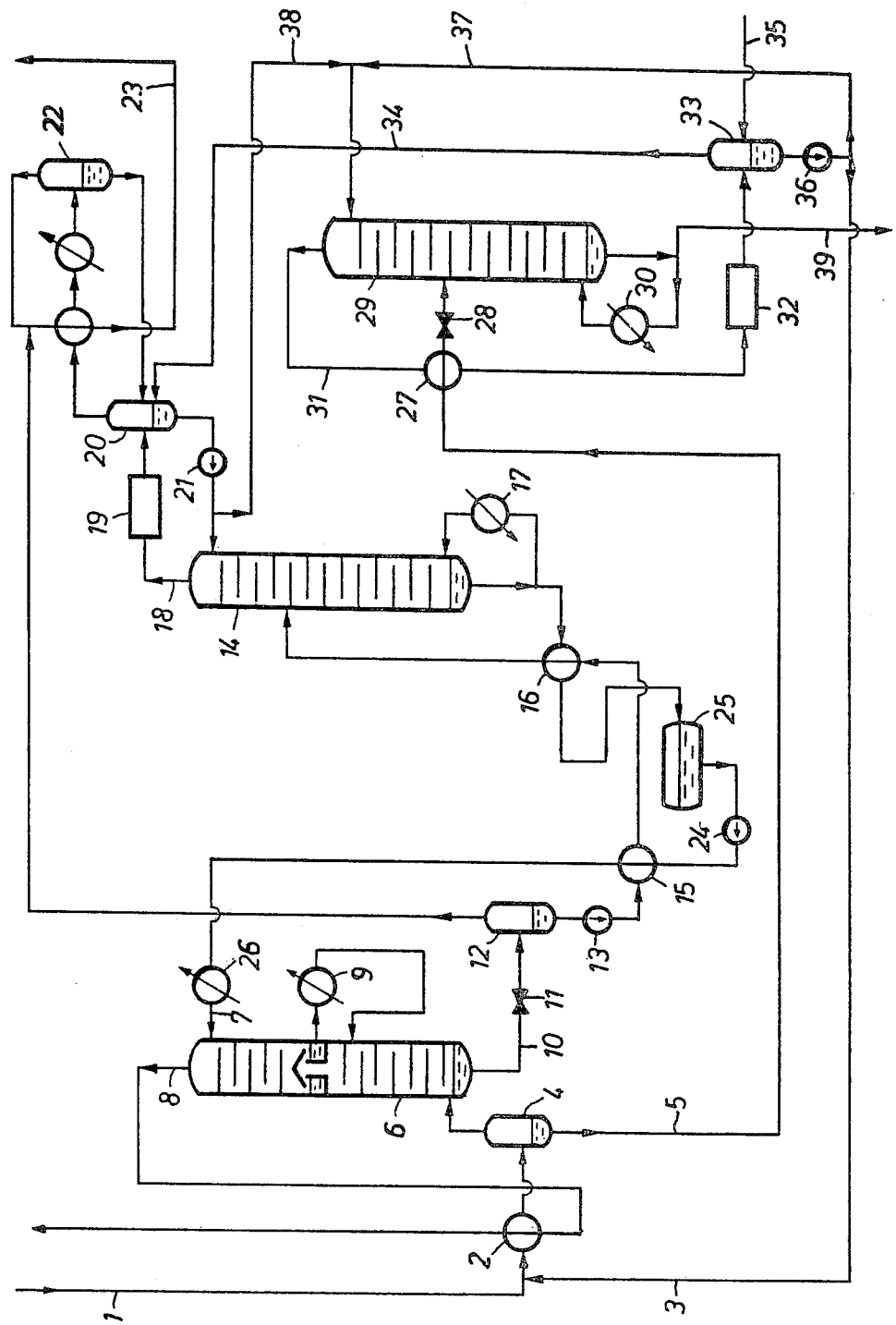

ENERGY EFFICIENT SCRUBBING OF SULFUR COMPOUNDS FROM MOIST GASEOUS MIXTURES

BACKGROUND OF THE INVENTION

This invention relates to a process for selectively scrubbing out sulfur compounds, especially hydrogen sulfide and carbonyl sulfide, from moist gaseous mixtures by scrubbing at temperatures of below 0° C., with aromatic compounds as the scrubbing liquid, wherein the moist gaseous mixture is brought into contact with liquid methanol before being cooled to the scrubbing temperature, the scrubbing liquid after absorption of the sulfur compounds is subjected to thermal regeneration, and the resultant regenerated scrubbing liquid is thereafter recycled into the scrubbing stage.

German Pat. No. 1,231,222, incorporated by reference herein, describes a process for the preparation of ammonia synthesis gas. In this method, a raw gas is first produced by the gasification of solid or liquid fuels with oxygen and steam; this raw gas, after removal of the sulfur compounds, is introduced into a stage wherein the carbon monoxide is catalytically converted into carbon dioxide, and is then subjected to a scrubbing step to remove the carbon dioxide.

The removal of sulfur compounds, especially hydrogen sulfide as well as carbonyl sulfide, is conducted by low-temperature scrubbing with xylene. The resultant xylene, loaded with sulfur compounds, after preliminary heating, is introduced into a regenerating column heated at the sump with superheated steam to about 165° C., and in the column, the xylene is therein freed of the absorbed sulfur compounds.

Usually the raw gas is saturated with water vapor, at inlet temperature, methanol is introduced into this raw gas prior to cooling to the scrubbing temperature, in order to prevent ice formation. The resultant methanol, at least partly saturated with water, is withdrawn from the heat exchanger serving for the cooling of the raw gas to the scrubbing temperature and is fed into a methanol-water separating column. The regenerated methanol is recycled to the aforementioned heat exchanger. A certain residual proportion of aqueous methanol, however, is still contained in the cooled raw gas to be fed to the xylene scrubbing stage. This aqueous methanol passes into the regenerating column together with the xylene loaded with sulfur compounds during the scrubbing procedure. The sump liquid, consisting primarily of xylene and minor proportions of the methanol-water mixture, which has collected in the sump of the regenerating column, must be heated to about 165° C. to drive out the sulfur compounds to the desired extent.

The conventional process aims at preventing the methanol content in the xylene from rising above 2% by weight. For this reason, a portion of the xylene withdrawn from the sump of the regenerating column and regenerated with respect to the sulfur compounds, is fed, for the purpose of methanol separation, to a distillation column while the other portion of the regenerated xylene is reintroduced into the scrubbing column. In the distillation column heated at the sump with superheated steam to about 150° C., the distillation results in a liquid xylene phase and a vapor phase of methanol-water, the latter being withdrawn overhead. This methanol-water mixture is subsequently likewise fed into said methanol-water separating column.

While an acceptable process, there is, nevertheless, room for improvement in the above-described conventional system. Specifically, the part of the plant serving for raw gas purification comprises a relatively large number of separating columns, each requiring operating energy. In particular, a comparatively large quantity of high-pressure steam is required to drive out the absorbed components from the scrubbing medium and to keep the methanol content of the scrubbing medium at a low level, i.e. below 2% by weight.

SUMMARY OF THE INVENTION

A principal object of this invention is to provide a process of the type mentioned hereinabove improved with respect to investment costs and energy requirements.

Upon further study of the specification and appended claims, further objects and advantages of this invention will become apparent to those skilled in the art.

To attain these objects, it has been unexpectedly discovered that, contrary to the German patent, it is advantageous to maintain a methanol concentration of from above 2% to 30% by weight in the scrubbing liquid to be recycled from the thermal regeneration stage to the scrubbing stage. These higher methanol concentrations in the scrubbing liquid permit:

(a) the complete utilization of the selectivity range of the aromatic-methanol mixture with respect to the sulfur compounds, especially the hydrogen sulfide, to be scrubbed out;

(b) a reduction of the heating requirement for regenerating purposes, due to the lowering of the sump temperature;

(c) a substantial reduction of the heat transfer area required in the scrubbing agent countercurrent heat exchanger; and (d) the complete elimination of the distillation column which, in the known process, is required for maintaining a methanol concentration of less than 2% by weight in the scrubbing liquid.

It is known that the xylene and toluene absorb hydrogen sulfide selectively as compared to carbon dioxide at temperatures of below 0° C. This selectivity, as is known, extends in the case of xylene, also to carbonyl sulfide, as well as other sulfur compounds (German Pat. No. 1,231,222). As has now been discovered, the last-mentioned property can also be found in toluene, in contradistinction to viewpoints expressed heretofore by those skilled in the art.

As has been determined by appropriate measurements, the carbon dioxide and sulfur-compound solubilities in aromatics such as benzene, toluene, and xylene initially do not vary much with increasing methanol content up to 30% weight but thereafter increase up to about the solubility in pure methanol. Since the increase in carbon-dioxide solubility is substantially higher than that of the sulfur-compound solubilities, this increase was generally considered to be associated with a decrease in the selective scrubbing out of the sulfur compounds with respect to carbon dioxide. If a scrubbing liquid is utilized consisting essentially of aromatics, specifically toluene or xylene, and instead of only up to 2% by weight, in this case 2–30% by weight, preferably 3–30% by weight, or 3–20% by weight or even only 3–8% by weight of methanol, then the consequence thereof is merely a quite small reduction in selectivity in the range from about 2% to 30% by weight, of methanol but otherwise no reduction in selectivity at all, with respect to the absorption of sulfur compounds to carbon-dioxide. In exchange for this small reduction in selectivity, the advantage gained is that the process can be conducted so that the sump of the regenerating column is at considerably lower temperatures than possible in case of the use of pure aromatics or only very minor methanol additions, i.e. less than 2% by weight. Thus, at a conventional pressure of about 4 bar, the temperature required in the sump of the regenerating column with the use of a scrubbing liquid of toluene containing 8% by weight of methanol is merely about 111° C. as compared with about 166° C. in case of pure toluene. Generally, the temperature and pressure of the sump scrubbing liquid in this invention is about 75° to 120° C., and 1.5 to 6 bars, respectively. The heating requirement for the regenerating column can thus be supplied by low-pressure steam having a condensation temperature of 100° to 170° C. The regenerating effect is not impaired by this lowering of the temperature, since the role of the stripping stream is now extensively assumed by methanol, which passes over into the vapor phase at far lower temperatures than toluene. Normally the operating pressure of the regenerating column depends on the required conditions of the hydrogen sulfur fraction.

A distillation column for limiting the methanol concentration is thus no longer required in the process of this invention.

The lower limits of the claimed or preferred concentration ranges result from the consideration that the temperature drop desired in the sump of the regenerating column is attainable to a sufficient degree only if the methanol content in the scrubbing liquid is not too low. For this reason, it is especially advantageous to operate in the concentration range of between 3% and 8% by weight of methanol, for example, at a minimum concentration of 3, 4, 5, 6, 7 or 8%, in particular.

This effect occurs not only in the case of toluene but also in the case of xylene and other functionally equivalent aromatic compounds, especially those having a relatively close physicochemical relationship to toluene.

The gaseous mixtures to be processed can be raw gases containing a great variety of sulfur compounds, especially hydrogen sulfide and carbonyl sulfide, such as, for example, synthesis raw gases for methanol or ammonia synthesis, which are fed after desulfurization to a catalytic stage for the conversion of carbon monoxide, or raw gases evolving from the partial oxidation of solid or liquid carbonaceous fuels which are subsequently used for the production of electricity in plants employing gas turbines and wherein no subsequent carbon dioxide removal is provided. In general, such raw gases will comprise at least some hydrogen sulfide ($H_2S$), e.g., 0.05 to 2 mol% and some carbonyl sulfide, e.g. 0 to 0.2 mol.%, and is saturated with water.

BRIEF DESCRIPTION OF THE DRAWING

In the attached drawing, there is illustrated, schematically, a preferred comprehensive embodiment of the present invention.

DETAILED DESCRIPTION OF THE DRAWING

Via a conduit 1, a raw gas is supplied containing 35 mol-% hydrogen, 43 mol-% carbon monoxide, 20 mol-% carbon dioxide, 0.97 mol-% hydrogen sulfide, 0.06 mol-% carbonyl sulfide, the remainder comprising nitrogen, argon, and methane. The water content is 0.19 mol.%. The total quantity of raw gas amounts to 80,000 $Nm^3/h$; the gas temperature is 38° C.; and the gas pressure is 36 bar. Prior to introduction into a heat exchanger 2, wherein the raw gas is cooled to about −10° C., liquid methanol is introduced into the raw gas to prevent ice formation which might otherwise occur during the cooling step due to the presence of water vapor in the raw gas. This methanol is fed via a conduit 3. After absorption of the largest portion of the moisture present in the raw gas, the now aqueous methanol is withdrawn from the separator 4 connected downstream of the heat exchanger 2 and is fed via a conduit 5 to the methanol-water separation stage. The raw gas, thus freed of the largest portion of $H_2O$ but still containing a certain residual proportion of aqueous methanol vapor, is introduced into the lower portion of a scrubbing column 6. Via a conduit 7, a scrubbing liquid cooled to −33° C. is introduced to the upper portion of this column, this scrubbing liquid consisting of 92% by weight of toluene and 8% by weight of methanol. During the gas-liquid contact taking place in the interior of the column, this scrubbing liquid absorbs the sulfur compounds contained in the raw gas almost entirely. The product gas exiting from the head of the column via a conduit 8 contains at most 160 vppm (parts per million by volume) of hydrogen sulfide and carbonyl sulfide. Otherwise, the product gas consists of 37 mol-% hydrogen, 45 mol-% carbon monoxide, 17 mol-% carbon dioxide, and about 1 mol-% nitrogen, argon, and methane, The amount of gas withdrawn via conduit 8 is 75,470 $Nm^3/h$. After being heated in heat exchanger 2, the product gas has a temperature of 28° C. and is obtained under a pressure of about 34 bar.

The methanol-containing toluene trickling downwards in the upper portion of scrubbing column 6 is heated up due to the heat of absorption liberated during the absorption of the sulfur compounds, this heat being partially removed in a cooler 9. The scrubbing liquid introduced in total to the head of the scrubbing column 6 amounts to 82 t/h. (metric tons per hour). The scrubbing liquid, discharged from the sump of the scrubbing column via a conduit 10, which now contains the sulfur compounds and a certain proportion of carbon dioxide, is subjected to an intermediate expansion in a throttle valve 11 to about 4 bar. During this step the temperature of the loaded scrubbing liquid drops from −18° C. to −24° C.

In a separator 12, the gaseous fraction, liberated during expansion and containing primarily carbon monoxide and hydrogen entrained in the scrubbing column, is separated from the scrubbing liquid.

The loaded scrubbing liquid from separator 12 is passed through two heat exchangers 15 and 16 wherein it is heated countercurrently to regenerated, warm scrubbing liquid first to 25° and then to 86° C. Subsequently, the resultant heated scrubbing liquid is fed to the upper portion of a regenerating column 14 by means of a pump 13. The regenerating column 14 is heated at the sump, namely by means of steam flowing through a heat exchanger 17. The vapor phase liberated by this heating step from the branched-off portion of the sump liquid of the regenerating column contains methanol for the most part. This vapor phase rises within the regenerating column, countercurrently to the downwardly trickling, loaded scrubbing liquid, and strips out from the latter the dissolved sulfur compounds, dissolved carbon dioxide, and lower-boiling components still contained in the scrubbing liquid.

The gaseous fraction discharged via conduit 18 from the head of the regenerating column 14 further contains methanol and steam which, after cooling to about 59° C. in a cooler 19, are withdrawn as condensate from a downstream-connected separator 20 and returned by means of a pump 21 to the head of the regenerating column as reflux liquid. The proportions of methanol and steam still contained in the gaseous fraction withdrawn from separator 20 are recovered, after further cooling of this fraction to, in total, about −33° C., in another separator 22 as the condensate and finally likewise returned to the head of the regenerating column 14.

The gaseous fraction liberated in separator 22 is combined with the gaseous fraction liberated in separator 12, so that via conduit 23 a so-called hydrogen sulfide fraction can be removed containing 17 mol-% hydrogen sulfide, 1 mol-% carbonyl sulfide, 73 mol-% carbon dioxide, and the remainder being the lower-boiling components, carbon monoxide, hydrogen, nitrogen, argon, and methane. This hydrogen sulfide fraction is obtained in an amount of 4,530 Nm$^3$/h at a temperature of 30° C. and under a pressure of 2.75 bar.

The scrubbing liquid discharged from the sump of the regenerating column 14 at a temperature of 111° C., completely regenerated with respect to the sulfur compounds, is cooled in heat exchangers 16 and 15 countercurrently to cold, loaded scrubbing liquid to 30° C. and −17° C., respectively, and, after intermediate storage in a storage tank 25, returned to the head of the scrubbing column 6 by means of the pump 24, the latter also serving for the recompression to the pressure of this scrubbing column. The final cooling of the regenerated scrubbing liquid to the scrubbing temperature of about −33° C. takes place in a cooler 26.

The liquid fraction, aqueous methanol, separated from the raw gas in separator 4, is passed via conduit 5, heat exchanger 27, as well as throttle valve 28 into a methanol-water separating column 29. This separating column operates under a pressure of about 4 bar. The sump temperature of the separating column, produced by way of a reboiler 30 operated with steam, is about 146° C. From the head of the separating column, almost anhydrous methanol is withdrawn via a conduit 31, cooled to about 60° C. in heat exchangers 27 and 32, and thus condensed. A small proportion of lower-boiling components is liberated in a separator 33, discharged via a conduit 34, and combined in separator 20 with the gaseous head product of the regenerating column 14. If necessary, small amounts of methanol required for compensating for methanol losses are introduced via 35 into the separator 33. The regenerated methanol is withdrawn by means of a pump 36 from the separator 33 and recycled via conduit 3 into the raw gas conduit 1. Reflux liquid for the methanol-water separating column is fed via conduits 37 and 38. The water collecting in the sump of the methanol-water separating column is withdrawn via a conduit 39.

Maintenance of the predetermined 8% methanol scrubbing liquid in the sump of column 14 is assured by conventional analytical and control techniques. When the percentage drops to about 5%, make-up methanol is introduced via conduit 35.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the selective removal of a sulfur compound component comprising hydrogen sulfide from moist gaseous mixtures, the process comprising scrubbing the gaseous mixture at a temperature below 0° C., with a scrubbing liquid consisting essentially of toluene or xylene or other aromatics, prior to said scrubbing stage contacting the moist gaseous mixture with liquid methanol before the gaseous mixture is cooled to the scrubbing temperature, subjecting the scrubbing liquid containing absorbed sulfur compounds, after the scrubbing, to a thermal regeneration stage, and recycling resultant thermally regenerated scrubbing agent to the scrubbing stage, the improvement comprising: maintaining a methanol concentration of above 2% to about 30% by weight in the scrubbing liquid to be recycled from the thermal regeneration stage to the scrubbing stage.

2. A process according to claim 1, wherein the scrubbing agent consisting essentially of toluene.

3. A process according to claim 1, wherein the scrubbing agent consisting essentially of xylene.

4. A process according to claim 1, comprising maintaining a methanol concentration of 3–30% by weight in the scrubbing agent.

5. A process according to claim 1, comprising maintaining a methanol concentration of 3–20% by weight in the scrubbing agent.

6. A process according to claim 1, comprising maintaining a methanol concentration of 3–8% by weight in the scrubbing agent.

7. A process according to claim 1, comprising maintaining a methanol concentration of 4–30, 5–30, 6–30, 7–30 or 8–30% by weight in a scrubbing agent.

8. A process according to claim 1, further comprising maintaining the temperature of the sump fluid in the regeneration column at about 75° to 120° C.

9. A process according to claim 8, further comprising maintaining the pressure of the sump liquid at about 1.5 to 6 bar.

10. A process according to claim 1, wherein the raw gas to be scrubbed additionally contains H$_2$S, COS, CO$_2$ and H$_2$O.

11. In a process for the selective removal of a sulfur compound component comprising hydrogen sulfide from moist gaseous mixtures, the process comprising contacting the moist gaseous mixture with liquid methanol, subsequently scrubbing the gaseous mixture at a temperature below 0° C., with a scrubbing liquid consisting essentially of toluene, xylene or other aromatics, subjecting the scrubbing liquid containing absorbed sulfur compounds, after the scrubbing of the gaseous mixture, to a thermal regeneration stage, and recycling resultant thermally regenerated scrubbing agent to the scrubbing stage, the improvement comprising maintaining a methanol concentration of above 2% to about 30% by weight in the scrubbing liquid to be recycled from the thermal regeneration stage to the scrubbing stage, said maintaining step comprising monitoring the methanol concentration of the regenerated scrubbing liquid withdrawn from said thermal regeneration stage, and adding make-up methanol when the concentration of methanol in the regenerated scrubbing liquid falls outside the specified concentration, whereby the thermal regeneration stage can be conducted with the sump thereof at a considerably lower temperature than with substantially pure aromatics, and with no substantial loss of selectivity of the scrubbing liquid to sulfur compounds in the scrubbing stage.

12. A process according to claim 11 wherein said maintaining step comprises:

discharging scrubbing liquid containing absorbed sulfur compounds, from the scrubbing stage, heating said discharged scrubbing liquid and feeding the resultant heated discharged scrubbing liquid to the upper portion of a regenerating column, which is heated at the sump, to withdraw regenerated heated scrubbing liquid containing methanol from the sump thereof, monitoring the methanol concentration in the sump and indirectly adding make-up methanol to the regenerated heated scrubbing liquid in the sump when the concentration of methanol therein drops to about 5%, cooling the regenerated scrubbing liquid withdrawn from the sump of the regenerating column to a temperature below 0° C. and returning the cooled regenerated scrubbing liquid to perform the scrubbing therewith.

* * * * *